US009935516B2

(12) United States Patent
Horng et al.

(10) Patent No.: US 9,935,516 B2
(45) Date of Patent: Apr. 3, 2018

(54) INNER-ROTOR MOTOR (71) Applicant: Sunonwealth Electric Machine Industry Co., Ltd., Kaohsiung (TW)

(72) Inventors: Alex Horng, Kaohsiung (TW); Tso-Kuo Yin, Kaohsiung (TW); Chi-Min Wang, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 292 days.

(21) Appl. No.: 14/826,232

(22) Filed: Aug. 14, 2015

(65) Prior Publication Data

US 2016/0105066 A1 Apr. 14, 2016

(30) Foreign Application Priority Data

Oct. 9, 2014 (TW) .............................. 103135244 A (51) Int. Cl.
*H02K 3/38* (2006.01)
*H02K 5/08* (2006.01)
*H02K 1/18* (2006.01)
*H02K 3/52* (2006.01)

(52) U.S. Cl.
CPC .............. *H02K 5/08* (2013.01); *H02K 1/185* (2013.01); *H02K 3/38* (2013.01); *H02K 3/522* (2013.01)

(58) Field of Classification Search
CPC  H02K 5/08; H02K 1/185; H02K 3/38; H02K 3/522
USPC ......................................................... 310/89
See application file for complete search history.

(56) References Cited

U.S. PATENT DOCUMENTS

| 2,532,823 | A | * | 12/1950 | Schumann | ............. | H02K 7/145 173/217 |
| 7,554,226 | B2 | * | 6/2009 | Kojima | .................. | H02K 3/524 310/156.36 |
| 9,231,448 | B2 | * | 1/2016 | Horng | ..................... | H02K 3/522 |
| 9,407,127 | B2 | * | 8/2016 | Miyabara | ............... | H02K 3/522 |
| 9,712,003 | B2 | * | 7/2017 | Yin | ......................... | H02K 1/187 |
| 2006/0071569 | A1 | * | 4/2006 | Stewart | .................. | H02K 1/148 310/194 |
| 2006/0091739 | A1 | * | 5/2006 | Hilton | ...................... | H02K 1/04 310/45 |
| 2011/0115314 | A1 | * | 5/2011 | Du | ......................... | H02K 1/148 310/50 |
| 2013/0057120 | A1 | * | 3/2013 | Takasu | .................... | F04B 35/04 310/68 C |

(Continued)

FOREIGN PATENT DOCUMENTS

CN  201261184 Y  6/2009
CN  102457120 A  5/2012
(Continued)

*Primary Examiner* — Forrest M Phillips
(74) *Attorney, Agent, or Firm* — Alan D. Kamrath; Kamrath IP Lawfirm, P.A.

(57) ABSTRACT

An inner-rotor motor for preventing the formation of an electrical conducting path between an iron core and a housing of the motor includes a stator and a rotor. The stator includes the housing, an insulating layer and the iron core. The insulating layer is arranged between the housing and the iron core and prevents the electrical conducting path from forming between the housing and the iron core. The rotor includes a shaft rotatably coupled with the housing, and a permanent magnet unit is arranged around the shaft.

18 Claims, 7 Drawing Sheets

(56) References Cited

U.S. PATENT DOCUMENTS

2014/0103759 A1\* 4/2014 Miyabara ............... H02K 3/522
 310/71

FOREIGN PATENT DOCUMENTS

| CN | 203387369 U | 1/2014 |
|----|-------------|--------|
| CN | 203491824 U | 3/2014 |
| TW | 201424206 A | 6/2014 |

\* cited by examiner

INNER-ROTOR MOTOR

CROSS REFERENCE TO RELATED APPLICATIONS

The application claims the benefit of Taiwan application serial No. 103135244, filed on Oct. 9, 2014, the subject matter of which is incorporated herein by reference.

BACKGROUND OF THE INVENTION

1. Field of the Invention

The present invention generally relates to an inner-rotor motor and, more particularly, to an inner-rotor motor which does not form any electrical conducting path between an iron core and a housing of the motor.

2. Description of the Related Art

Figure 1:
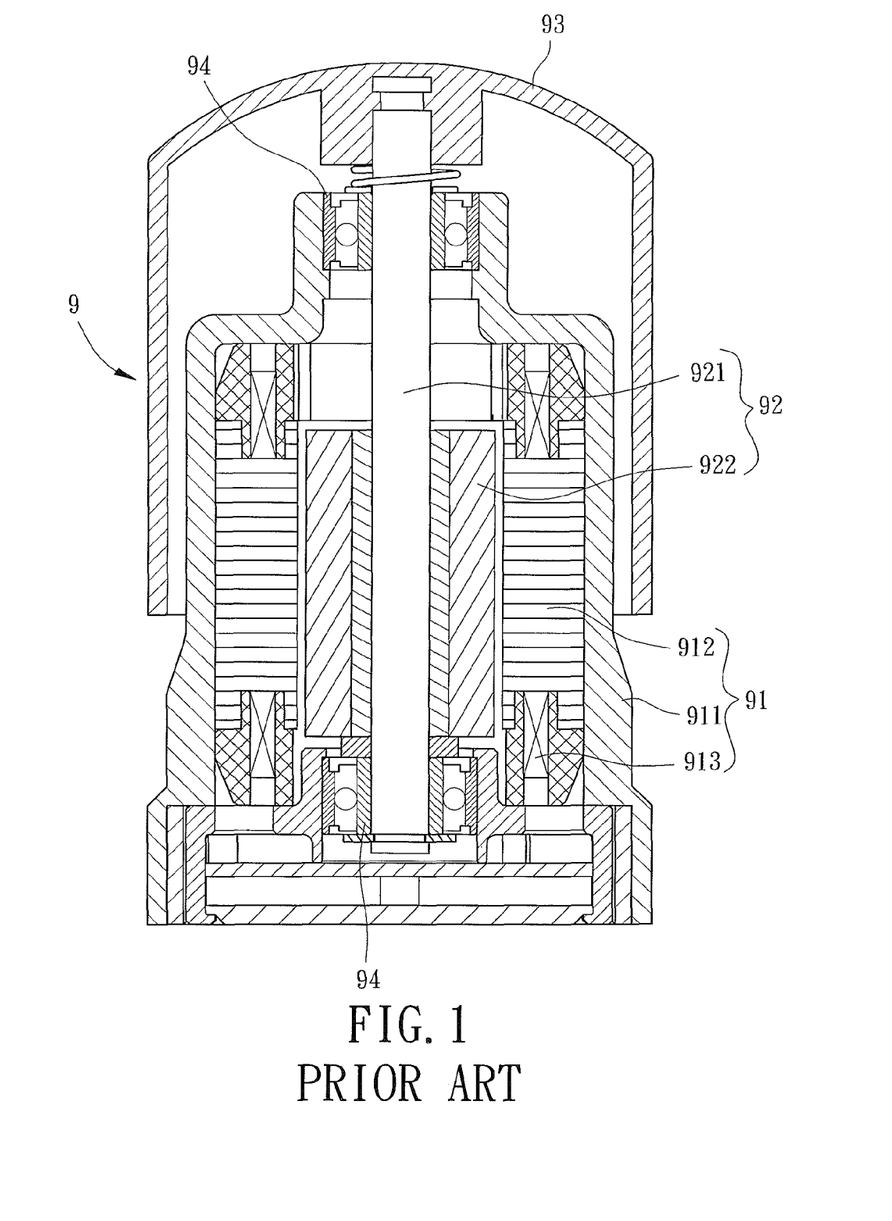
FIG. 1 is a cross sectional view of a cooling fan having a conventional inner-rotor motor.

A cooling fan 9 having a conventional inner-rotor motor is shown in FIG. 1 and includes a stator 91, a rotor 92 and an impeller 93. The stator 91 and the rotor 92 jointly form the conventional inner-rotor motor. The stator 91 includes a housing 911 and an iron core 912 coupled to an inner surface of the housing 911. The rotor 92 includes a shaft 921 and a permanent magnet 922 coupled to an outer circumferential surface of the shaft 921. The rotor 92 is rotatably coupled inside the stator 91, and a gap is formed between the permanent magnet 922 and the iron core 912. One end of the shaft 921 extends outside the housing 911 for coupling with the impeller 93. As such, the stator 91 is able to drive the rotor 92 to rotate, and the impeller 93 is thus driven to rotate for cooling purposes.

In the conventional inner-rotor motor, the stator 91 is press fitted fit to the inner surface of the housing 911. Therefore, the iron core 912 is able to be adhered to the housing 911 closely. However, a conducting wire may be arranged outside the housing. In addition, the housing 911 is made of metal, and the iron core 912 is also made of a conductive material such as a silicon steel plate. Since the iron core 912 is adjacent to the housing 911, the conducting wire may easily cause electromagnetic interference to the iron core when electrified. Thus, noise and vibration are generated during rotation of the inner-rotor motor, and the operational stability of the inner-rotor motor is adversely affected.

Furthermore, in the case that the conducting material of a coil 913 arranged on the iron core 912 is exposed to air due to the wearing of the insulating coating, an electrical conducting path may be formed between the iron core 912 and the housing 911 since the iron core 912 is made of silicon steel plates and the housing 911 is made of metal. Thus, a leakage current may be generated on the exposed portion of the conducting material of the coil 913. In addition, the shaft 921 of the rotor 92 of the inner-rotor motor is usually coupled to the housing via a bearing 94. The bearing 94 is able to rotate relative to the housing 911 for rotatably coupling the rotor 92 inside the stator 91. When the bearing 94 is in the form of a conventional bearing structure such as a ball bearing or a sleeve bearing, the leakage current of the coil 913 may directly flow to the outer surface the inner-rotor motor via the iron core 912, the housing 911, the bearing 94 and the shaft 921. Thus, the safety of the inner-rotor motor is significantly reduced.

In light of the above, since the operational stability and safety of the conventional inner-rotor motor are poor, it is necessary to improve such an inner-rotor motor for increasing its market value.

SUMMARY OF THE INVENTION

It is therefore the objective of this invention to provide an inner-rotor motor including an insulating layer arranged between a housing and an iron core of the inner-rotor motor. The insulating layer is adapted to separate the housing and the iron core from each other, thus improving the operational stability of the inner-rotor motor.

It is another objective of this invention to provide an inner-rotor motor including an insulating layer which achieves the function of electrical isolation between the housing and the iron core. Thus, the electrical conducting path between the housing and the iron core is not formed, and safety of the inner-rotor motor is enhanced.

The present invention provides an inner-rotor motor including a stator and a rotor. The stator includes a housing, an insulating layer and an iron core. The insulating layer is arranged between the housing and the iron core and prevents the electrical conducting path from forming between the housing and the iron core. The rotor includes a shaft rotatably coupled with the housing, and a permanent magnet unit is arranged around the shaft.

In a form shown, the insulating layer includes an insulating member made of an insulating material. The insulating member is coupled to an inner surface of the housing. The iron core couples with an inner periphery of the insulating member in order to arrange the insulating layer between the housing and the iron core.

In a form shown, the inner periphery of the insulating member defines a through hole and a coupling surface, and the iron core is coupled with the coupling surface. The insulating member is radially arranged between the inner surface of the housing and the iron core in order to separate the iron core and the housing from each other along the radial direction.

In a form shown, the insulating member is press fit to the inner surface of the housing or formed on the inner surface of the housing by injection molding.

In a form shown, the insulating member is adhered to the inner surface of the housing.

In a form shown, the insulating layer includes an air layer and at least one connecting portion. The at least one connecting portion has two ends respectively coupled with the housing and the iron core. The connecting portion extends along a radial direction of the shaft and forms the air layer between the housing and the iron core.

In a form shown, the insulating layer further includes an insulating member coupled with the housing. The at least one connecting portion includes two connecting portions. The insulating member includes two ends each being coupled with one of the two connecting portions. Each of the two connecting portions includes two ends respectively coupled with the insulating member and the iron core and extends along the radial direction of the shaft in order to form the air layer between the insulating member and the iron core.

In a form shown, the insulating layer further includes an insulating member coupled with the iron core. The at least one connecting portion includes two connecting portions. The insulating member includes two ends each being coupled with one of the two connecting portions. Each of the two connecting portions includes two ends respectively coupled with the insulating member and the housing and extends along the radial direction of the shaft in order to form the air layer between the insulating member and the housing.

In a form shown, the housing comprises a receiving portion adapted to receive the bearing, and the shaft extends through the bearing.

In a form shown, the receiving portion includes an opening located at an end of the shaft. A cover plate is coupled with the housing and covers the opening of the receiving portion.

In a form shown, the housing includes a first coupling portion. The insulating layer includes a second coupling portion coupled with the first coupling portion in order to couple the insulating layer with the inner surface of the housing.

In a form shown, the first coupling portion is a shoulder formed on the inner surface by a punching process. The second coupling portion is an abutting surface abutting with the first coupling portion.

In a form shown, the insulating layer further includes two extending portions formed on two ends of the insulating layer. Each of the two extending portions extends from the insulating layer to the housing along the axial direction and abuts with the housing.

In a form shown, a coil is arranged on the iron core.

In a form shown, the insulating layer further includes a bobbin formed on an outer periphery of the iron core. The bobbin is adapted to be wound with the coil.

In a form shown, the bobbin is integrally formed on the outer periphery of the iron core.

In a form shown, the bobbin is integrally formed with the insulating layer.

In a form shown, the bobbin comprises a top bobbin and a bottom bobbin.

In a form shown, each of the top bobbin and the bottom bobbin is integrally formed with the insulating layer.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

In the various figures of the drawings, the same numerals designate the same or similar parts. Furthermore, when the terms "first", "second", "third", "fourth", "inner", "outer", "top", "bottom", "front", "rear" and similar terms are used hereinafter, it should be understood that these terms have reference only to the structure shown in the drawings as it would appear to a person viewing the drawings, and are utilized only to facilitate describing the invention.

DETAILED DESCRIPTION OF THE INVENTION

Figure 2:
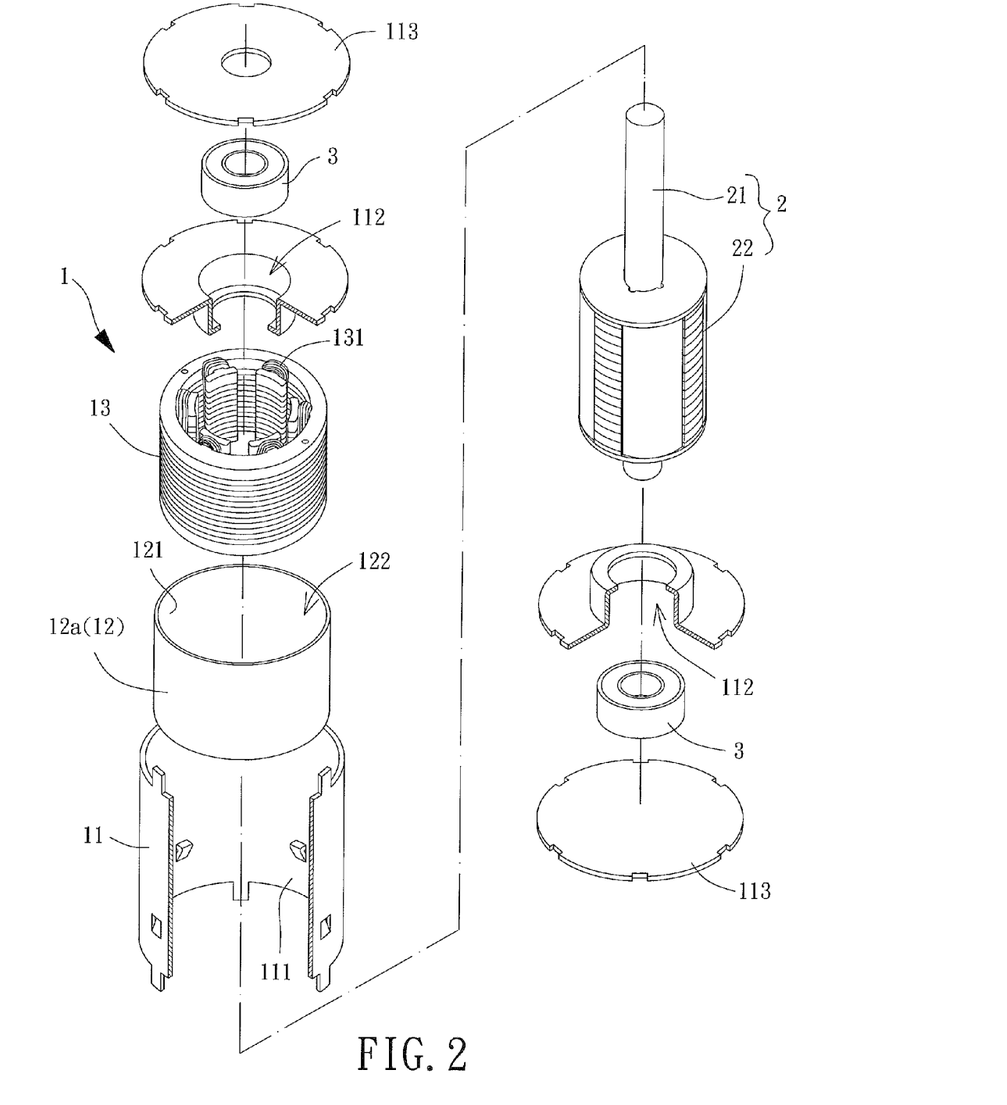
FIG. 2 is an exploded view of an inner-rotor motor according to a first embodiment of the present invention.
Figure 3:
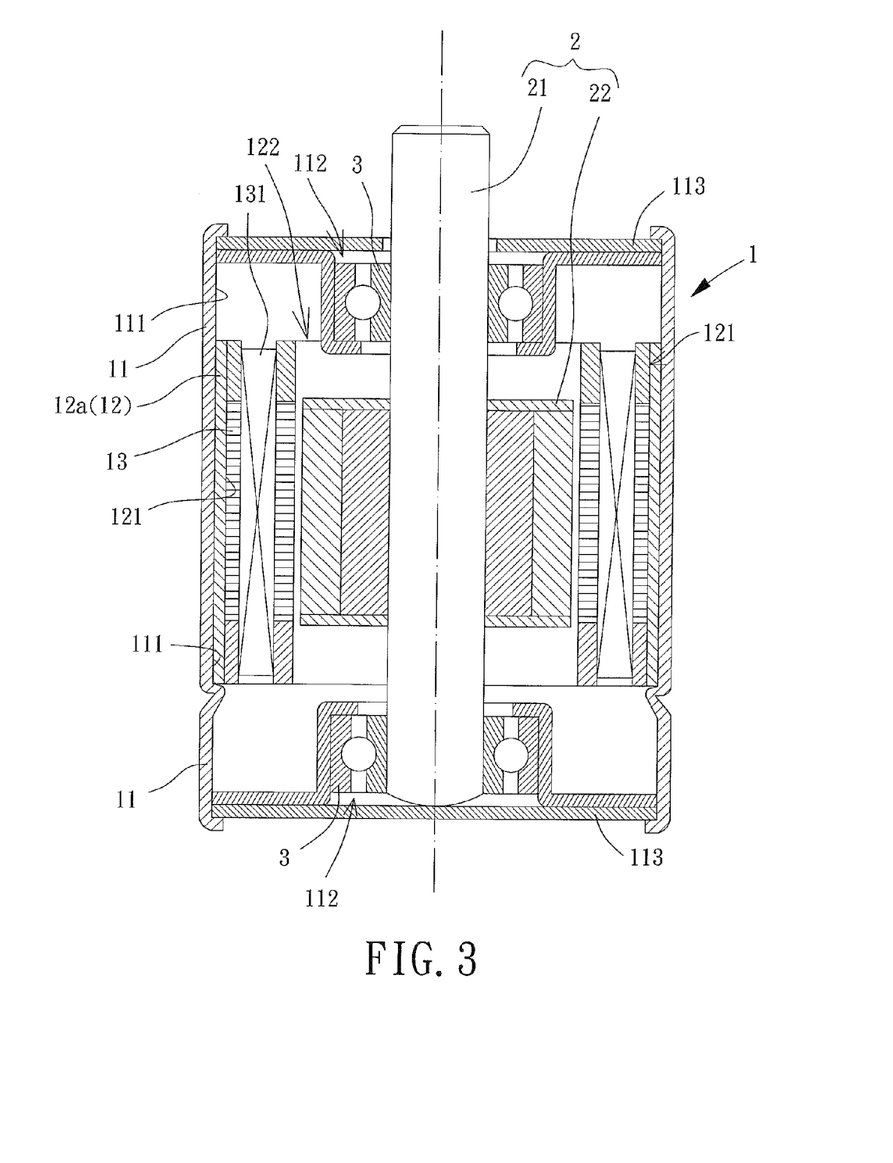
FIG. 3 is a cross sectional view of the inner-rotor motor according to the first embodiment of the present invention.

Please refer to FIGS. 2 and 3, an inner-rotor motor according to a first embodiment of the present invention includes a stator 1 and a rotor 2 rotatably coupled to the stator 1.

The stator 1 includes a housing 11, an insulating layer 12 and an iron core 13. The insulating layer 12 is arranged between the housing 11 and the iron core 13, and the housing 11 is usually made of metal. In this embodiment, the insulating layer 12 includes an insulating member 12a, which is a substantially insulating structure made of an insulating material, such as an insulating sleeve, an insulating cover or an insulating shell. As such, the insulating member 12a may be coupled with the housing 11, and the iron core 13 couples with an inner periphery of the insulating member 12a. The housing 11 includes an inner surface 111 for coupling with the insulating member 12a. The iron core 13 may be coupled to a coupling surface 121 of the insulating member 12a facing away from the housing 11. Specifically, a through hole 122 is arranged at the center of the insulating member 12a for receiving the iron core 13. The coupling surface 121 is formed on the inner periphery of the insulating member 12a adjacent to the through hole 122 for coupling with the iron core 13. As such, the insulating member 12a of the insulating layer 12 is radially arranged between the housing 11 and the iron core 13, and the electrical conducting path between the iron core 13 and the housing 11 is not formed. In addition, a coil 131 is arranged on the iron core 13.

The rotor 2 includes a shaft 21 rotatably coupled with the stator 1 and a permanent magnet unit 22 arranged around the shaft 21. The shaft 21 and the permanent magnet unit 22 extend through the iron core 13 of the stator 1, and a gap is formed between the permanent magnet unit 22 and the iron core 13.

The inner-rotor motor according to the first embodiment further includes a bearing 3, and the housing 11 may further include a receiving portion 112 for receiving the bearing 3. The shaft 21 extends through the bearing 3. The bearing 3 includes an inner ring and an outer ring abutting with the housing 11 and the shaft 21, respectively. Thus, the shaft 21 is rotatably coupled with the housing 11, and the shaft 21 coupled with the permanent magnet unit 22 is therefore able to rotate relative to the housing 11. The receiving portion 112 includes an opening located at an end of the shaft facing away from the permanent magnet unit 22. The housing 11 may further be coupled with a cover plate 113 for covering the opening of the receiving portion 112, thus forming the stator 1 as a cylindrical shape.

In this embodiment, the insulating member 12a of the insulating layer 12 is press fit to the inner surface 111 of the housing 11. In other words, an outer diameter of the insulating member 12a is slightly larger than a diameter of the inner surface 111 of the housing 11. Therefore, the insulating member 12a can be press fit to the inner surface 111. Alternatively, the insulating member 12a of the insulating layer 12 may be made of a plastic material, so that the insulating member 12a can be formed on the inner surface 111 of the housing 11 by injection molding. In this way, the outer diameter of the insulating member 12a is equal to the diameter of the inner surface 111 of the housing 11. However, the outer diameter of the insulating member 12a may alternatively be smaller than the diameter of the inner surface 111 of the housing 11, to couple the insulating member 12a to the inner surface 111 by clamping, adhesion, fastening or screwing.

According to the structure described above, when the inner-rotor motor of the first embodiment is in use, since the stator 1 includes the insulating layer 12 radially arranged between the housing 11 and the iron core 13, the electrical conducting path between the iron core 13 and the housing 11 is not formed. In the case that a conducting wire is arranged outside the housing, since the insulating layer 12 separates the iron core 13 and the housing 11 from each other, it can prevent the conducting wire from generating electromagnetic interference to the iron core 13 when electrified. In the conventional inner-rotor motor where the iron core 912 directly abuts with the inner surface of the housing 911, the conducting wire outside the housing 911 may easily cause electromagnetic interference to the iron core 912 when electrified. In contrast, the inner-rotor motor according to the first embodiment of the present invention prevents electromagnetic interference generated during rotation, thus avoiding vibration and noise during rotation and improving the operational stability of the inner-rotor motor.

Furthermore, since the insulating layer 12 provides an electrical isolation effect between the housing 11 and the iron core 13, the electrical conducting path between the housing 11 and the iron core 13 is not formed. Even in the case that the conducting material of the coil 131 is exposed to air due to the wearing of the insulating coating, leakage current is not generated on the exposed portion of the conducting material of the coil 131 since no conducting path is created. Thus, safety of the inner-rotor motor according to the first embodiment is enhanced.

It is noted that the insulating layer 12 is radially arranged between the inner surface 111 of the housing 11 and the iron core 13, to separate the iron core 13 from the housing 11 along the radial direction. Thus, a proper distance is formed between the housing 11 and the iron core 13 along the radial direction, effectively preventing the electromagnetic field generated by the conducting wire outside the housing 11 from interfering with the iron core 13.

Figure 4:
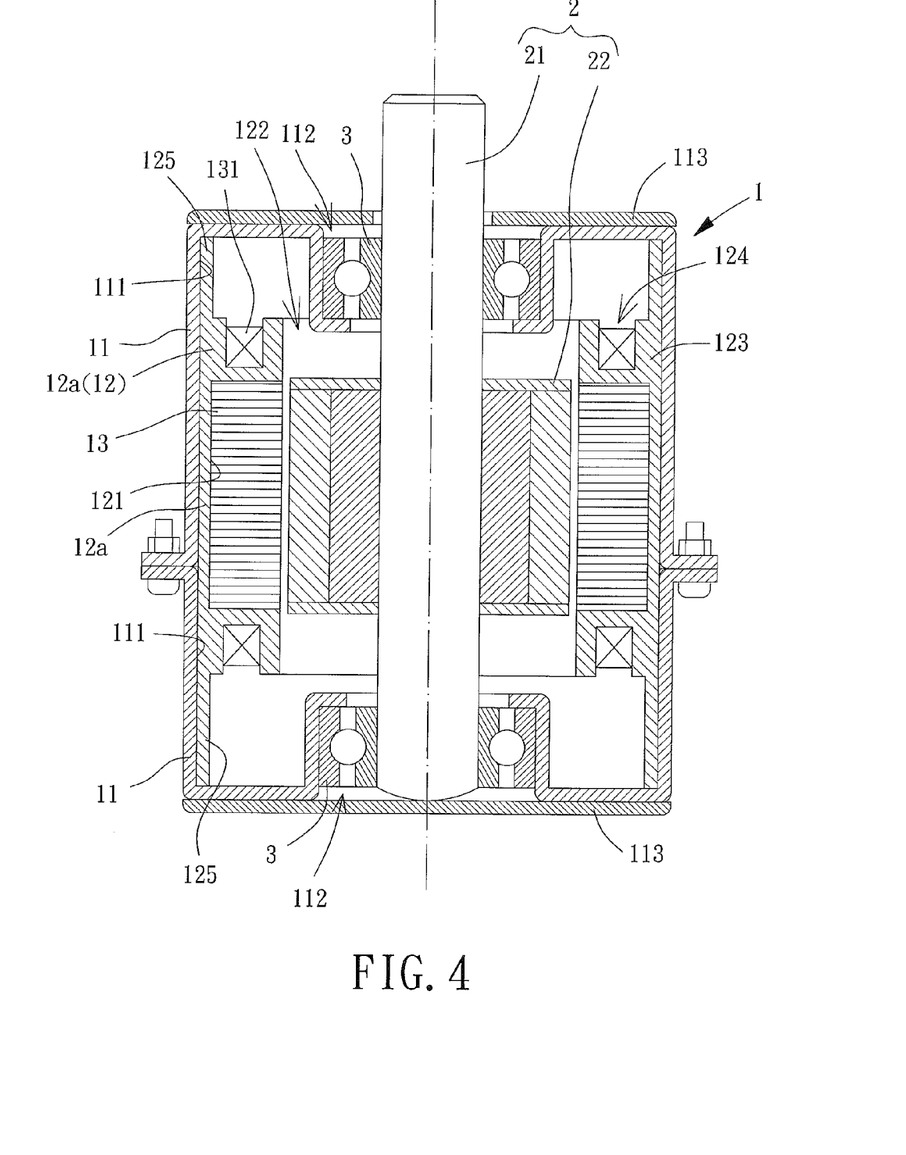
FIG. 4 is a cross sectional view of an inner-rotor motor according to a second embodiment of the present invention.

Please refer to FIG. 4, an inner-rotor motor according to a second embodiment of the present invention differs from the first embodiment in that the insulating layer 12 further includes a bobbin 123 formed on an outer periphery of the iron core 13 for the coil 131 to be wound around. Specifically, the bobbin 123 may be integrally formed with the insulating layer 12 on the outer periphery of the iron core 13. The bobbin 123 of the insulating layer 12 forms two recesses 124 on two ends of the iron core 13. The two recesses 124 are used to position the coil 13 on the iron core 13.

In contrast to the first embodiment where the insulating member 12a is press fit to the inner surface 111 of the housing 11, the insulating layer 12 of this embodiment further includes two extending portions 125 arranged at two ends of the insulating layer 12. Since the inner-rotor motor according to the second embodiment further includes the bobbin 123, the two extending portions 125 may couple to two sides of the bobbin 123, and each of the two extending portions 125 extends from the insulating layer 12 toward the housing 11 along the axial direction of the shaft 21. As such, each of the two extending portions 125 abuts with the housing 11, thus holding the insulating member 12a inside the housing 11. Therefore, even in the case that the insulating member 12a is not press fit to the inner surface 111 of the housing 11, the insulating member 12a of the insulating layer 12 may still be coupled with the housing 11 via the two extending portions 125.

Figure 5:
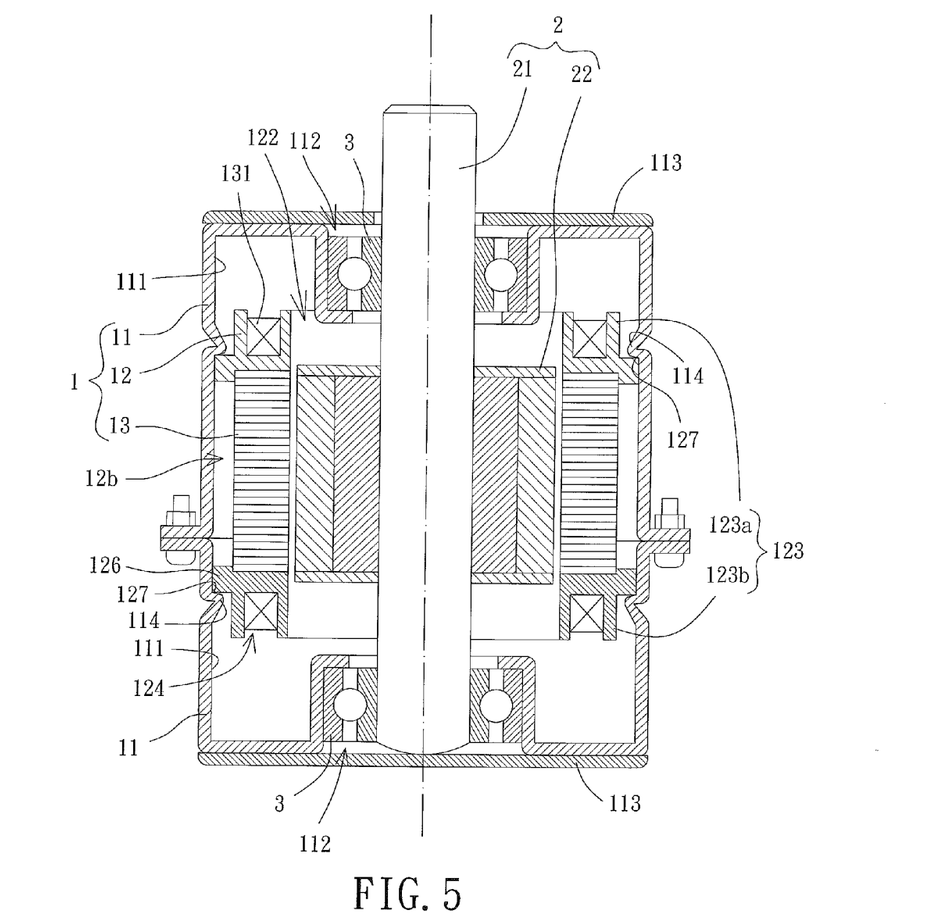
FIG. 5 is a cross sectional view of an inner-rotor motor according to a third embodiment of the present invention.

Please refer to FIG. 5, an inner-rotor motor according to a third embodiment of the present invention also includes a bobbin 123. The inner-rotor motor of this embodiment differs from the two embodiments described above in that the bobbin 123 includes a top bobbin 123a and a bottom bobbin 123b jointly holding the iron core 13 in place from two ends of the iron core 13. Each of the top bobbin 123a and the bottom bobbin 123b may be integrally formed on the insulating layer 12 and may form a recess 124 for positioning the coil 131 on the iron core 13.

As such, in both the second and third embodiments of the present invention, the insulating layer 12 separates the iron core 13 from the housing 11 along the radial direction of the housing 11. Besides, the insulating layer 12 further includes the bobbin 123 that positions the coil 131 on the iron core 13, thus reducing the production cost of the inner-rotor motor. The top bobbin 123a and the bottom bobbin 123b of the bobbin 123 may be integrally formed on the insulating layer 12. Alternatively, the bobbin 123 and the insulating layer 12 may be independent components. Alternatively, the top bobbin 123a, the bottom bobbin 123b and the insulating layer 12 may be independent components.

Please refer to FIG. 5 again, the inner-rotor motor according to the third embodiment of the present invention also includes a housing 11, an insulating layer 12 and an iron core 13. The insulating layer 12 is arranged between the housing 11 and the iron core 13. In contrast to the first embodiment where the insulating layer 12 simply includes the insulating member 12a, the insulating layer 12 of this embodiment is an air layer 12b. Specifically, the insulating layer 12 includes a connecting portion 126 having two ends respectively coupled with the housing 11 and the iron core 13. The connecting portion 126 may extend along a radial direction of the shaft 21 for separating the housing 11 and the iron core 13 from each other, thus forming a gap between the housing 11 and the iron core 13. The air layer 12 is the gap. In other words, in the inner-rotor motor of the third embodiment, the insulation function is provided by the air of the air layer 12b of the insulating layer 12, thus preventing the electrical conducting path from forming between the housing 11 and the iron core 13. As such, the insulating layer 12 of the inner-rotor motor according to the present invention may be a physical insulating structure (e.g. the insulating member 12a) or a space (e.g. the air layer 12b) that provides the desired insulation function by either an insulating material or air. Thus, the formation of the electrical conducting path between the iron core 13 and the housing 11 is effectively prevented.

On the other hand, in an inner-rotor motor according to another embodiment of the present invention, the housing 11 may further include a first coupling portion 114, and the insulating layer 12 may include a second coupling portion 127 coupled with the first coupling portion 114. Specifically, the coupling portion 114 may be a shoulder formed on the inner surface 111 by a punching process, and the shoulder may be in the form of a continuous annular flange. Alternatively, the shoulder may be in the form of a plurality of annularly spaced protrusions formed on the inner surface 111. The plurality of protrusions is preferably arranged in a ring shape along the inner surface 111. The second coupling portion 127 is an abutting surface, and the first coupling portion 114 is a portion of the inner surface 111 having a reduced diameter. Therefore, the second coupling portion 127 may abut with the first coupling portion 114 for coupling the insulating layer 12 with the inner surface 111 of the housing 11. Preferably, the housing 11 and the insulating layer 12 respectively form two first coupling portions 114 and two second coupling portions 127 on two ends of the insulating layer 12. The two first coupling portions 114 abut with the two second coupling portions 127. Thus, the insulating layer 12 is held between the two first coupling portions 114. However, the first coupling portion 114 and the second coupling portion 127 may alternatively be coupled together by screwing, fastening or adhesion.

Figure 6:
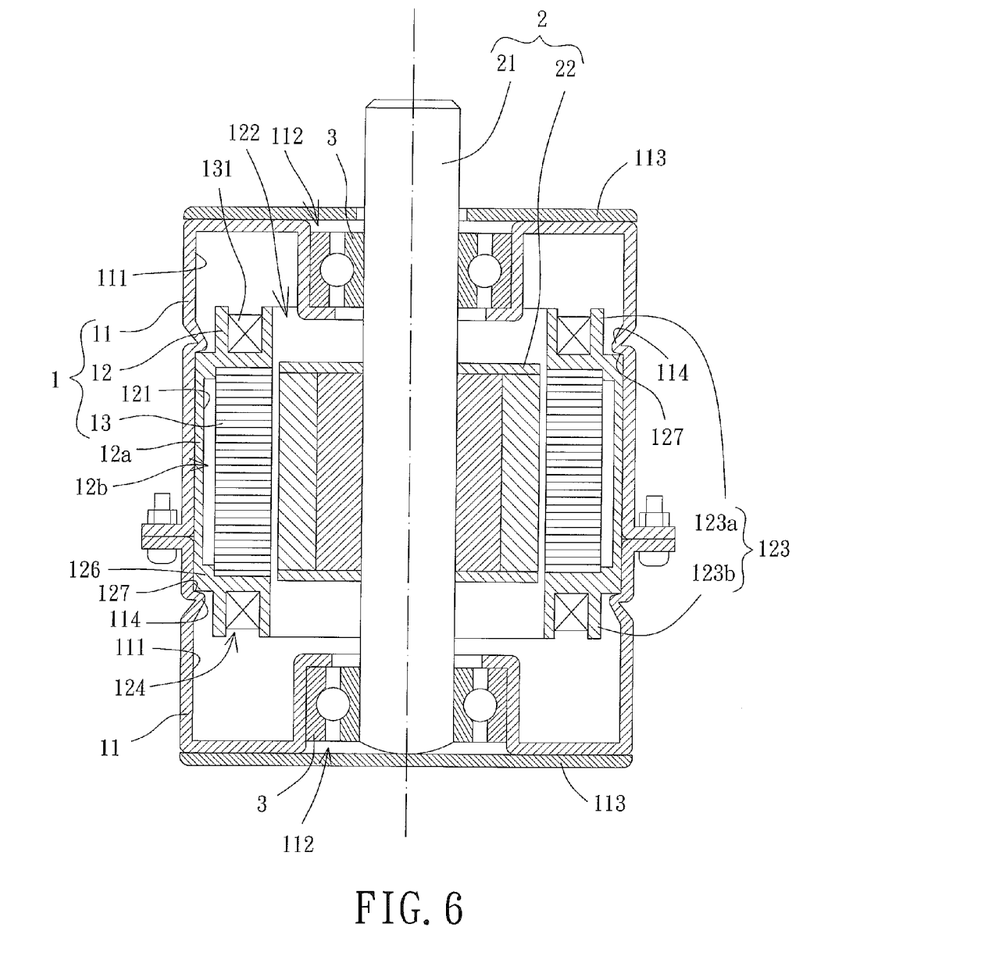
FIG. 6 is a cross sectional view of an inner-rotor motor according to a fourth embodiment of the present invention.

Please refer to FIG. 6, in an inner-rotor motor according to a fourth embodiment of the present invention, the stator 1 also includes a housing 11, an insulating layer 12 and an iron core 13. The insulating layer 12 is radially arranged between the housing 11 and the iron core 13. The inner-rotor motor of this embodiment differs from those embodiments above in that the insulating layer 12 includes an insulating member 12a and an air layer 12b. Specifically, the insulating member 12a is coupled to an inner surface 111 of the housing 11 and includes two ends each being coupled with a connecting portion 126. The connecting portion 126 includes two ends respectively coupled with the insulating member 12a and the iron core 13 and extends along a radial direction of the shaft 21 for separating the insulating member 12a and the iron core 13 from each other. Thus, a gap is formed between the iron core 13 and a coupling surface 121 of the insulating member 12a facing away from the housing 11. The air layer 12b of the insulating layer 12 is the gap.

Figure 7:
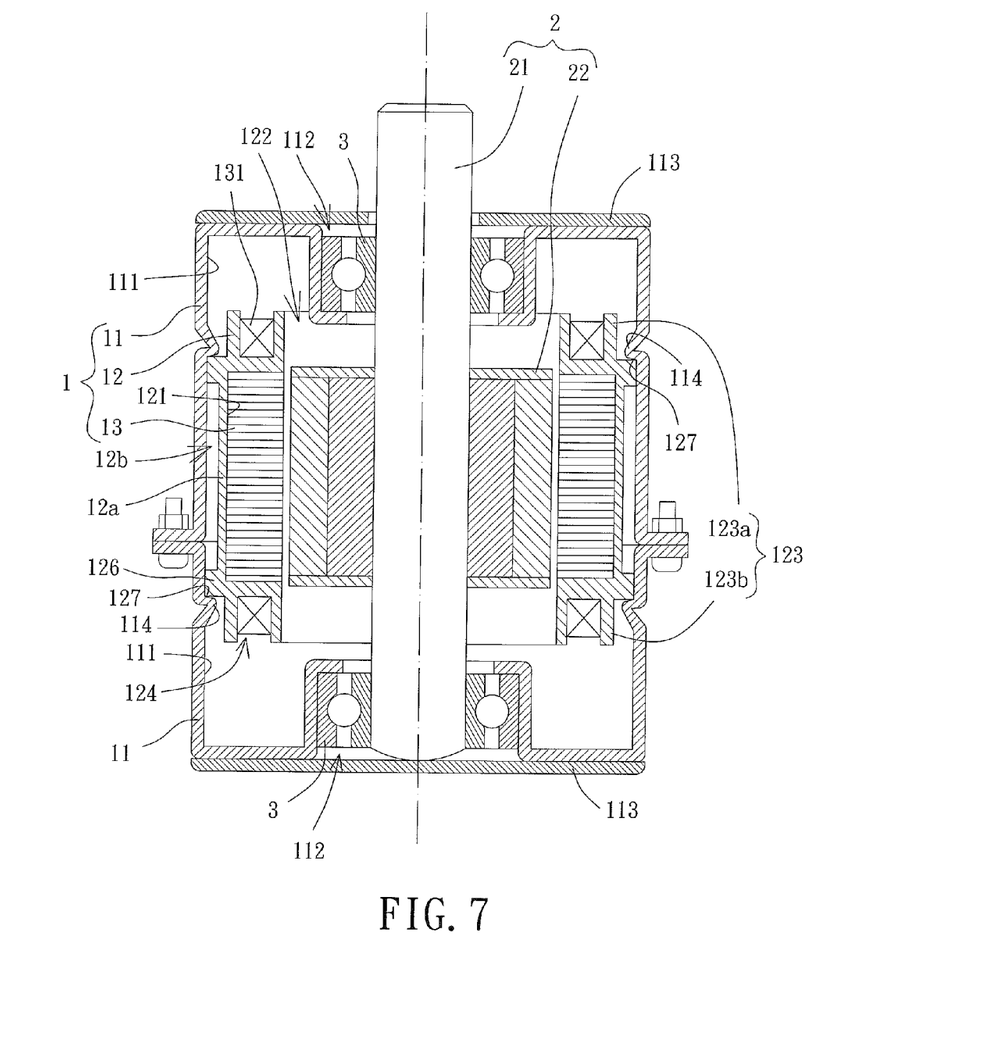
FIG. 7 is a cross sectional view of an inner-rotor motor according to another implementation of the fourth embodiment of the present invention.

Please refer to FIG. 7, in another implementation of the inner-rotor motor according to the fourth embodiment of the present invention, the insulating layer 12 also includes an insulating member 12a and an air layer 12b. A coupling surface 121 of the insulating member 12a facing away from the housing 11 is coupled with the iron core 13. The insulating member 12a includes two ends each being coupled with a connecting portion 126. Two ends of each of the two connecting portions 126 are coupled with the insulating member 12a and the housing 11, respectively. The connecting portion 126 extends along a radial direction of the shaft 21 for separating the insulating member 12a and the housing 11 from each other. Thus, a gap is formed between the insulating member 12a and the inner surface 111 of the housing 11. The air layer 12b of the insulating layer 12 is the gap. As such, the insulating layer 12 in any one of the implementations of the inner-rotor motor according to the fourth embodiment of the present invention separates the iron core 13 and the housing 11 from each other using the insulating member 12a and the air layer 12b, thus preventing the electrical conducting path from forming between the iron core 13 and the housing 11.

As a conclusion of the above, by providing the insulating layer 12 between the housing 11 and the iron core 13 of the stator 1, the electromagnetic field generated by the inducting wire outside the housing 11 will not be able to easily interfere with the iron core 13. Thus, noise and vibration generated during the rotation of the inner-rotor motor is prevented, and the operational stability of the inner-rotor motor is improved.

Furthermore, since the insulating layer 12 provides a desired electrical isolation effect between the housing 11 and the iron core 13, the electrical conducting path between the iron core 13 and the housing 11 is not formed. Even in the case that the conducting material of the coil 131 arranged around the outer circumferential surface of the iron core 13 is exposed to air due to the wearing of the insulating coating, leakage current on the exposed portion of the conducting material of the coil 131 is still prevented. Thus, safety of the inner-rotor motor is enhanced.

In summary, the inner-rotor motor according to the present invention improves the operational stability and safety of the inner-rotor motor.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. An inner-rotor motor comprising:
    a stator comprising a housing, an insulating layer and an iron core, wherein the housing includes two ends spaced from each other in an axial direction, wherein the insulating layer is arranged between the housing and the iron core in a radial direction perpendicular to the axial direction and prevents an electrical conducting path from forming between the housing and the iron core, wherein a coil is arranged on the iron core; and
    a rotor comprising a shaft rotatably coupled with the housing, with a permanent magnet unit arranged around the shaft,
    wherein the insulating layer further comprises a bobbin formed on an outer periphery of the iron core, wherein the bobbin is located between the two ends of the housing in the axial direction, wherein the iron core is located between the insulating layer and the permanent magnet in the radial direction perpendicular to the axial direction, and wherein the bobbin is wound with the coil.

2. The inner-rotor motor as claimed in claim 1, wherein the insulating layer comprises an insulating member made of an insulating material, wherein the insulating member is coupled to an inner surface of the housing, and wherein the iron core couples with an inner periphery of the insulating member to arrange the insulating layer between the housing and the iron core.

3. The inner-rotor motor as claimed in claim 2, wherein the inner periphery of the insulating member defines a through hole and a coupling surface, wherein the iron core couples with the coupling surface, and wherein the insulating member is radially arranged between the inner surface of the housing and the iron core to separate the iron core and the housing from each other in the radial direction.

4. The inner-rotor motor as claimed in claim 2, wherein the insulating member is press fit to the inner surface of the housing.

5. The inner-rotor motor as claimed in claim 2, wherein the insulating member is formed on the inner surface of the housing by injection molding.

6. The inner-rotor motor as claimed in claim 2, wherein the insulating member is adhered to the inner surface of the housing.

7. The inner-rotor motor as claimed in claim 1, wherein the insulating layer comprises an air layer and at least one connecting portion having two ends respectively coupled with the housing and the iron core, and wherein the connecting portion extends in a radial direction of the shaft and forms the air layer between the housing and the iron core.

8. The inner-rotor motor as claimed in claim 7, wherein the insulating layer further comprises an insulating member coupled with the housing, wherein the at least one connecting portion comprises two connecting portions, wherein the insulating member comprises two ends each being coupled with one of the two connecting portions, and wherein each of the two connecting portions comprises two ends respectively coupled with the insulating member and the iron core and extends in the radial direction of the shaft to form the air layer between the insulating member and the iron core.

9. The inner-rotor motor as claimed in claim 7, wherein the insulating layer further comprises an insulating member coupled with the iron core, wherein the at least one connecting portion comprises two connecting portions, wherein the insulating member comprises two ends each being coupled with one of the two connecting portions, and wherein each of the two connecting portions comprises two ends respectively coupled with the insulating member and the housing and extends in the radial direction of the shaft to form the air layer between the insulating member and the housing.

10. The inner-rotor motor as claimed in claim 1, wherein the housing comprises a receiving portion configured to receive the bearing, and wherein the shaft extends through the bearing.

11. The inner-rotor motor as claimed in claim 10, wherein the receiving portion comprises an opening located at an end of the shaft, wherein a cover plate is coupled with the housing, and wherein the cover plate covers the opening of the receiving portion.

12. The inner-rotor motor as claimed in claim 1, wherein the housing comprises a first coupling portion, and wherein the insulating layer comprises a second coupling portion coupled with the first coupling portion to couple the insulating layer with an inner surface of the housing.

13. The inner-rotor motor as claimed in claim 12, wherein the first coupling portion is a shoulder on the inner surface of the housing, and wherein the second coupling portion is an abutting surface abutting with the first coupling portion.

14. The inner-rotor motor as claimed in claim 1, wherein the insulating layer further comprises two extending portions on two ends of the insulating layer, and wherein each of the two extending portions extends from the insulating layer to the housing in the axial direction and abuts with the housing.

15. The inner-rotor motor as claimed in claim 1, wherein the bobbin is integrally formed on the outer periphery of the iron core.

16. The inner-rotor motor as claimed in claim 15, the bobbin is integrally formed with the insulating layer.

17. The inner-rotor motor as claimed in claim 1, wherein the bobbin comprises a top bobbin and a bottom bobbin.

18. The inner-rotor motor as claimed in claim 17, wherein each of the top bobbin and the bottom bobbin is integrally formed with the insulating layer.

* * * * *